Patented Aug. 12, 1947

2,425,456

UNITED STATES PATENT OFFICE 2,425,456

REMOVAL OF FILTER CAKE FROM EARTH BORES

Donald C. Bond, Northbrook, Ill., assignor to The Pure Oil Company, Chicago, Ill., a corporation of Ohio No Drawing. Continuation of application Serial No. 514,967, December 20, 1943. This application July 23, 1945, Serial No. 606,721

6 Claims. (Cl. 252—8.55)

This invention relates to the removal of filter cake from the walls of earth bores and more particularly to the removal of filter cake resulting from the drilling of oil or gas wells in which is used a basic dye-starch positive colloid drilling mud. This application is a continuation of application Ser. No. 514,967, filed Dec. 20, 1943.

In Patent No. 2,273,925 there is disclosed a process of drilling wells in which is used a basic dye, positive colloid drilling mud containing starch, wheat gluten, and /or acid casein. This invention is directed to removing from the well-bore the filter cake resulting from the use of drilling muds disclosed in the aforesaid patent. It is necessary to remove the filter cake from the portion of the wall passing through the producing formation in order to permit free passage of oil from the producing formation into the well-bore.

As disclosed in Patent No. 2,273,925 the mud contains a basic dye such as methyl violet, bentonite, water, an anti-gas-cutting agent such as diglycol laurate, a stabilizing agent selected from the group consisting of starch, wheat gluten and acid casein, barytes as weighting material, and sufficient hydrochloric acid, when necessary, to adjust the pH of the solution to a desirel level below about 7.0 to 7.5. Bentonite is used in the amount of 1 or 2% by weight based on the unweighted mud. The stabilizing agent may be present in amounts of from 1 to 10% by weight. The basic dye is present in amount sufficient to produce positive charges on the mineral particles dispersed in the water. The amount of barytes is sufficient to give the desired specific gravity to the mud. In the examples given in the patent 350 grams of barytes are added to 500 grams of the remaining constituents of the mud to obtain a specific gravity of 1.5.

I have discovered that the filter cake resulting from use of drilling muds of the nature described in the aforesaid patent can be readily disintegrated by bringing in contact with the filter cake a strong mineral acid of proper concentration. As acids which may be used to disintegrate the filter cake, may be mentioned hydrochloric, sulfuric, nitric, hydrofluoric and fluoboric acid, although I prefer to use hydrochloric, sulfuric or fluoboric acids for the reason that these acids can be inhibited against corrosion of the metal casing in the well-bore and do not form objectionable products by reaction with the earth in the well-bore, which clog the producing formation.

The minimum concentration of acid which is required to disintegrate the filter cake is specific for each acid.

Filter cake resulting from use of basic dye-starch positive colloid drilling mud requires hydrochloric acid solution having a concentration greater than 3 normal and preferably a concentration of about 6 normal. Concentrations below 3 normal have very little effect on the disintegration of the filter cake. Sulfuric acid should be used in concentrations of approximately 12 normal or greater to disintegrate the filter cake. Nitric acid should be used in a concentration of not less than approximately 2 normal. Hydrofluoric acid should be used in concentrations of not less than approximately 20 normal and fluoboric acid should be used in concentrations of not less than about 2 normal.

The concentration of the acid which is necessary to disintegrate the filter cake resulting from drilling muds of the type disclosed in the aforesaid Patent No. 2,273,925 is less than that which is required to disintegrate filter cake resulting from the use of starch-containing, negatively charged colloid mud. Use of lower concentration acids is advantageous in that it cuts down corrosion of metal casing in the well-bore.

In order to demonstrate the invention, the following tests were made. Suspensions of wheat flour in plain water and in methyl violet solution were prepared by allowing the mixture of wheat flour and water, or solution, to stand at 180° F. for two hours, with occasional stirring. The suspensions were cooled to room temperature and were then allowed to filter through a filter paper on a Buchner funnel 3.5 inches in diameter under a pressure of 650 mm. of mercury for one hour, until a filter cake was built up on the filter paper. The liquid remaining in the filter was poured off and the filter cake was washed with water. The filter cake was then tested by first filtering water therethrough for one-half hour to determine the permeability of the cake to water. The water was then poured off the filter cake and various strong mineral acids of different concentrations were then tested by allowing each to filter through a fresh, washed, tested filter cake and the quantity of filtrate in a given time was determined. The results of the tests are given in the following table.

Table

| Test No. | Composition of Mixture Filtered, Per cent by Weight | | | Cc. Filtrate in 1 Hr. | Cc. H₂O Through Filter Cake in ½ Hr. | Acid Used | Cc. Acid Through Filter Cake in— | | | | | | | | |
|---|---|---|---|---|---|---|---|---|---|---|---|---|---|---|---|
| | Methyl Violet | Wheat Flour | Water | | | | 1 Min. | 2 Min. | 4 Min. | 5 Min. | 6 Min. | 10 Min. | 15 Min. | 20 Min. | 30 Min. |
| 1 | 3 | 10 | 87 | 3 | 1 | 6N HCl | 0 | 0 | 1 | | | 25 | | | |
| 2 | 3 | 10 | 87 | 3 | 1 | 3N HCl | 0 | 0 | 0 | | | | | | 3.5 |
| 3 | 3 | 10 | 87 | 2 | 1 | 2N HCl | 0 | 0 | 0 | | | | | | 1 |
| 4 | 3 | 10 | 87 | 2 | 1 | 12N H₂SO₄ | 0 | 0 | 3 | | | | | | 9 |
| 5 | 3 | 10 | 87 | 2 | 0.5 | 6N H₂SO₄ | 0 | 0 | 0 | | | | | | 1 |
| 6 | 3 | 10 | 87 | 3.5 | 1 | 6N HNO₃ | 0 | 0 | 0 | 24 | | | | | |
| 7 | 3 | 10 | 87 | 3.5 | 1 | 3N HNO₃ | 0 | 0 | 0 | | | | | | 24 |
| 8 | 3 | 10 | 87 | 2 | 1 | 2N HNO₃ | 0 | 0 | 0 | | | | | | 27 |
| 9 | 3 | 10 | 87 | 2.5 | 0.5 | 1N HNO₃ | 0 | 0 | 0 | | | | | | 2 |
| 10 | 3 | 10 | 87 | 2.5 | 1 | 0.5N HNO₃ | 0 | 0 | 0 | | | | | | 1 |
| 11 | 3 | 10 | 87 | 1 | 1 | 27N HF | 0 | 20 | | | | | | | |
| 12 | 3 | 10 | 87 | 1.5 | 0.5 | 13.5N HF | 0 | 0 | 0 | | | | | | 2 |
| 13 | 3 | 10 | 87 | 3 | 1.5 | 5.5N HBF₄ | 0 | 0 | 2 | | | | 38 | | |
| 14 | 3 | 10 | 87 | 3.5 | 1 | 2.75N HBF₄ | 0 | 0 | 1 | | | | | 40 | |
| 15 | 3 | 10 | 87 | 2.5 | 1.5 | 1.38N HBF₄ | 0 | 0 | 0 | | | | | | 4 |
| 16 | 3 | 10 | 87 | 3.5 | 1 | 0.69N HBF₄ | 0 | 0 | 0 | | | | | | 1 |
| 17 | | 10 | 90 | 3.5 | 2 | 9N HCl | 2 | 5 | 15 | | 40 | | | | |
| 18 | | 10 | 90 | 2 | 1 | 6N HCl | 0 | 0 | 1 | | | | | | 14 |
| 19 | | 10 | 90 | 1 | 6 | 6N HNO₃ | 5 | 8 | 13 | | | | | | 48 |
| 20 | | 10 | 90 | 1 | 4 | 4N HNO₃ | 0 | 1 | 3 | | | | | | 19 |
| 21 | | 10 | 90 | 1.5 | 2 | 1N HNO₃ | 0.5 | 1 | 1.5 | | | | | | 4 |
| 22 | | 10 | 90 | 1.5 | 1.5 | 0.5N HNO₃ | 0 | 0.5 | 1 | | | | | | 3 |

From the table it is apparent that filter cake formed from the mixture containing 3% methyl violet and 10% wheat flour was decomposed by acid of lower concentration than filter cake formed from the suspension containing no methyl violet. It is also apparent that fluoboric acid was more effective than the other acids when used in low concentration. The quantity of methyl violet in this suspension imparted a positive charge to the suspension and was sufficient to impart a positive charge to a drilling mud containing bentonite or other mineral colloid material.

Although our invention is applicable generally to basic dye positive colloid drilling muds of the type disclosed in Patent No. 2,273,925, it is particularly applicable to those muds prepared from starch, basic dye and mineral colloid particles, such as bentonite, suspended in water.

Although methyl violet was used as the basic dye for the purpose of the tests recorded in the foregoing table, it is to be understood that the invention is not limited to this particular dye, but is directed to basic dyes in general, including methylene blue, methylene green, methylene grey, methyl violet, Bismarck Brown R, Rhodamine B, acriflavine, chrysoidin Y and chrysoidin R. It should be further understood that the invention is directed to the use of starches in general and not limited to the particular starch (wheat flour) used in the tests.

It will be seen, therefore, that I have discovered a method of disintegrating filter cake resulting from the use of basic dye, positively charged, colloid, drilling muds containing a sealing agent, such as starch, and that I have not only discovered that strong acids of specific concentrations are required to disintegrate the filter cake, but that the concentration of acid is far lower than that required by starch-containing, negative colloid, drilling muds.

I claim:

1. The method of removing from the wall of an earth bore filter cake deposited from basic dye, positively charged, colloid, drilling mud composed substantially only of water, basic dye, an anti-gas-cutting agent, bentonite in the amount of approximately 1 to 2% by weight based on the unweighted mud, sufficient barytes to weight the mud to desired specific gravity and a material selected from the group consisting of starch, wheat gluten and acid casein, comprising introducing fluoboric acid of sufficient concentration to attack said filter cake into contact therewith.

2. The method in accordance with claim 1 in which the fluoboric acid has a concentration not less than approximately 2 normal.

3. The method in accordance with claim 1 in which the fluoboric acid has a concentration of 1.38–5.5 normal.

4. Method in accordance with claim 1 in which the material is starch.

5. Method in accordance with claim 1 in which the basic dye is methyl violet.

6. Method in accordance with claim 5 in which the anti-gas-cutting agent is diglycol laurate.

DONALD C. BOND.

REFERENCES CITED

The following references are of record in the file of this patent:

UNITED STATES PATENTS

| Number | Name | Date |
|---|---|---|
| 2,234,790 | Zacher | Mar. 11, 1941 |
| 2,300,393 | Ayers | Nov. 3, 1942 |
| 2,324,254 | Bertness et al. | July 13, 1943 |
| 2,338,282 | Flett | Jan. 4, 1944 |

OTHER REFERENCES

Lehnhard, Mud Acid; article in the Petroleum Engineer Reference Annual, 1943, pages 82, 85, 86, 88, 90, 92, 95 and 98.